United States Patent
Lee et al.

(10) Patent No.: US 12,046,756 B2
(45) Date of Patent: Jul. 23, 2024

(54) CELLULOSE DERIVATIVE COMPOSITION FOR SECONDARY BATTERY BINDER AND METHOD OF PREPARING COMPOSITION FOR SECONDARY BATTERY ELECTRODE COMPRISING THE SAME

(71) Applicants: ELECTRONICS AND TELECOMMUNICATIONS RESEARCH INSTITUTE, Daejeon (KR); Daegu Gyeongbuk Institute of Science and Technology, Daegu (KR)

(72) Inventors: Young-Gi Lee, Daejeon (KR); Dong Ok Shin, Sejong (KR); Yong Min Lee, Daegu (KR); Seoungwoo Byun, Daejeon (KR); Juhye Song, Daejeon (KR); Kwang Man Kim, Daejeon (KR); Dohwan Kim, Hwaseong (KR); Ju Young Kim, Sejong (KR); Jimin Oh, Daejeon (KR)

(73) Assignees: ELECTRONICS AND TELECOMMUNICATIONS RESEARCH INSTITUTE, Daejeon (KR); Daegu Gyeongbuk Institute of Science and Technology, Daegu (KR)

( * ) Notice: Subject to any disclaimer, the term of this patent is extended or adjusted under 35 U.S.C. 154(b) by 222 days.

(21) Appl. No.: 17/408,037

(22) Filed: Aug. 20, 2021

(65) Prior Publication Data
US 2022/0140346 A1 May 5, 2022

(30) Foreign Application Priority Data

Oct. 30, 2020 (KR) ......................... 10-2020-0142933
Apr. 2, 2021 (KR) ......................... 10-2021-0043538

(51) Int. Cl.
*H01M 4/62* (2006.01)
*C08B 11/12* (2006.01)
(Continued)

(52) U.S. Cl.
CPC ............. *H01M 4/622* (2013.01); *C08B 11/12* (2013.01); *C08L 1/286* (2013.01); *H01M 4/625* (2013.01);
(Continued)

(58) Field of Classification Search
None
See application file for complete search history.

(56) References Cited

U.S. PATENT DOCUMENTS 9,123,970 B2 9/2015 Lee et al.
10,374,206 B2 8/2019 Kim et al.
(Continued)

FOREIGN PATENT DOCUMENTS

CN 110028627 A * 7/2019
JP 2017-208231 A 11/2017
(Continued)

OTHER PUBLICATIONS

Nirmale, Trupti C., Bharat B. Kale, and Anjani J. Varma. "A review on cellulose and lignin based binders and electrodes: Small steps towards a sustainable lithium ion battery." International journal of biological macromolecules 103 (2017): 1032-1043. (Year: 2017).*
(Continued)

*Primary Examiner* — Haroon S. Sheikh
*Assistant Examiner* — Claire A Rutiser (57) ABSTRACT

Provided is a cellulose derivative composition for a secondary battery binder, a method of preparing a composition for a secondary battery electrode, including the same, and a secondary battery including the same. According to the
(Continued)

inventive concept, the cellulose derivative composition for a secondary battery binder may include a compound represented by Formula 1 below.

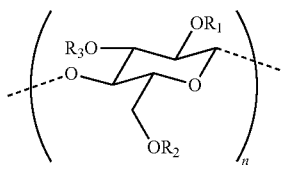

[Formula 1]

17 Claims, 5 Drawing Sheets

(51) Int. Cl.
    *C08L 1/28*       (2006.01)
    *H01M 10/052*    (2010.01)

(52) U.S. Cl.
    CPC ....... *H01M 10/052* (2013.01); *C08L 2201/52* (2013.01); *C08L 2203/20* (2013.01)

(56) References Cited

U.S. PATENT DOCUMENTS

| | | | | |
|---|---|---|---|---|
| 2012/0088155 A1* | 4/2012 | Yushin | ................ | H01M 4/622 |
| | | | | 977/773 |
| 2015/0030923 A1* | 1/2015 | Koo | ................ | H01M 4/583 |
| | | | | 429/217 |
| 2015/0162615 A1* | 6/2015 | Eberle | ................ | H01B 1/127 |
| | | | | 252/500 |
| 2017/0194647 A1* | 7/2017 | Courtel | ................ | H01M 4/622 |
| 2018/0026270 A1* | 1/2018 | Bae | ................ | H01M 4/587 |
| | | | | 429/217 |
| 2019/0225792 A1* | 7/2019 | Zhang | ................ | C09J 151/00 |
| 2021/0005893 A1* | 1/2021 | Kim | ................ | H01M 4/133 |
| 2021/0159486 A1* | 5/2021 | Chung | ................ | H01M 10/0525 |
| 2022/0149377 A1* | 5/2022 | Iwami | ................ | H01M 4/62 |

FOREIGN PATENT DOCUMENTS

| | | |
|---|---|---|
| KR | 10-2014-0005079 A | 1/2014 |
| KR | 10-2015-0071452 A | 6/2015 |
| KR | 10-2015-0100028 A | 9/2015 |
| KR | 10-2015-0129267 A | 11/2015 |
| KR | 10-1591712 B1 | 2/2016 |
| KR | 10-1683737 B1 | 12/2016 |
| KR | 10-2017-010368 A | 9/2017 |
| KR | 10-2017-0103688 A | 9/2017 |

OTHER PUBLICATIONS

P. Novak et al., "Study of styrene butadiene rubber and sodium methyl cellulose as binder for negative electrodes in lithium-ion batteries", J. Power Source, 2006.

R. Gordon et al., "Effect of carboxymethyl cellulose on the flow behavior of lithium-ion battery anode slurries and the electrical as well as mechanical properties of corresponding dry layers", J. Mater. Sci., 2020.

Sebastian Vogt et al., "Preparation of carboxymethylcellulose sulfate of high degree of substitution," Carbohydrate Research, 1995, pp. 315-320, vol. 266.

* cited by examiner

CELLULOSE DERIVATIVE COMPOSITION FOR SECONDARY BATTERY BINDER AND METHOD OF PREPARING COMPOSITION FOR SECONDARY BATTERY ELECTRODE COMPRISING THE SAME

CROSS-REFERENCE TO RELATED APPLICATIONS

This U.S. non-provisional patent application claims priority under 35 U.S.C. § 119 of Korean Patent Application Nos. 10-2020-0142933 filed on Oct. 30, 2020, and 10-2021-0043538, filed on Apr. 2, 2021, the entire contents of which are hereby incorporated by reference.

BACKGROUND

The present disclosure herein relates to a cellulose derivative composition for a secondary battery binder and a method of preparing a composition for a secondary battery electrode including the same.

Lithium ion secondary batteries are used as core power sources of portable electronic communication devices such as mobile phones and laptops. Compared to other energy storages such as capacitors and fuel cells, the lithium ion secondary batteries show high storage capacity, excellent charging and discharging characteristics and high processability and receive much attention as a next-generation energy storage device such as a wearable device and an energy storage system (ESS).

A lithium secondary battery is a battery composed of a positive electrode, a negative electrode, an electrolyte providing a moving passage of lithium ions between the positive electrode and the negative electrode, and a separator, and by oxidation and reduction reactions during the intercalation/deintercalation of lithium ions at the positive electrode and the negative electrode, electric energy is produced. In the lithium secondary battery, a lithium metal having high energy density becomes the negative electrode, and a liquid solvent becomes the electrolyte. At present, in the lithium secondary battery, an organic liquid electrolyte is used as the driving element of a high-performance and high-energy storage device. Recently, due to environmental issues and for the saving of manufacturing costs, development on a process for preparing a binder included in a slurry for manufacturing an electrode of a secondary battery is conducted.

SUMMARY

The present disclosure provides a cellulose derivative composition for a secondary battery binder, minimizing the formation of the microgels of a cellulose derivative.

The present disclosure also provides a method of preparing a composition for a secondary battery electrode, improving an initial wetting rate and a dissolution rate and improving the efficiency of a preparation process.

The present disclosure also provides a secondary battery having improved reliability.

The tasks to be solved by the present inventive concept is not limited to the above-described tasks, however other tasks not mentioned will be precisely understood from the description below by a person skilled in the art.

An embodiment of the inventive concept provides a cellulose derivative composition for a secondary battery binder, including a compound represented by Formula 1 below.

[Formula 1]

In Formula 1, $R_1$, $R_2$, and $R_3$ are each independently any one among a carboxymethyl group substituted with a monovalent metal (X), a functional group substituted with a monovalent metal (X) and including a sulfur (S) element, a functional group substituted with a monovalent metal (X) and including a phosphorus (P) element, and hydrogen, the monovalent metal (X) is any one among lithium (Li), potassium (K), rubidium (Rb), and cesium (Cs), and "n" is an integer of 1 or more.

In an embodiment, the functional group substituted with a monovalent metal (X) and including a sulfur (S) element may be $-SO_3X$.

In an embodiment, the functional group substituted with a monovalent metal (X) and including a phosphorus (P) element may be $-PO_3RX$ or $-PO_3X_2$, and R may be a hydrocarbon group of 1 to 10 carbon atoms.

In an embodiment, the compound represented by [Formula 1] may be the Formula of Xanthan Gum below, where at least one H in $-COOH$ functional groups may be substituted with a monovalent metal among lithium (Li), potassium (K), rubidium (Rb), and cesium (Cs).

[Formula of Xanthan Gum]

In an embodiment, the compound represented by [Formula 1] may be the Formula of Pectin below, where at least one H in $-COOH$ functional groups may be substituted with a monovalent metal among lithium (Li), potassium (K), rubidium (Rb), and cesium (Cs).

[Formula of Pectin]

In an embodiment, the compound represented by [Formula 1] may be the Formula of Guar Gum below, where at least one H in —OH functional groups may be substituted with a carboxymethyl group substituted with a monovalent metal (X), a functional group substituted with a monovalent metal (X) and including a sulfur (S) element, or a functional group substituted with a monovalent metal (X) and including a phosphorus (P) element, and the monovalent metal (X) may be any one among lithium (Li), potassium (K), rubidium (Rb), and cesium (Cs).

[Formula of Guar Gum]

In an embodiment, the compound represented by [Formula 1] may be the Formula of Dextran below, where at least one H in —OH functional groups may be substituted with a carboxymethyl group substituted with a monovalent metal (X), a functional group substituted with a monovalent metal (X) and including a sulfur (S) element, or a functional group substituted with a monovalent metal (X) and including a phosphorus (P) element, and the monovalent metal (X) may be any one among lithium (Li), potassium (K), rubidium (Rb), and cesium (Cs).

[Formula of Dextran]

According to an embodiment of the inventive concept, a method of preparing a composition for a secondary battery electrode includes: preparing an aqueous solution including a cellulose derivative composition including a compound represented by Formula 1 below; adding an active material to the aqueous solution of a cellulose derivative and stirring to prepare a first slurry; and adding an emulsion to the first slurry and stirring.

[Formula 1]

In Formula 1, $R_1$, $R_2$, and $R_3$ are each independently any one among a carboxymethyl group substituted with a monovalent metal (X), a functional group substituted with a monovalent metal (X) and including a sulfur (S) element, a functional group substituted with a monovalent metal (X) and including a phosphorus (P) element, and hydrogen, the monovalent metal (X) is any one among lithium (Li), potassium (K), rubidium (Rb), and cesium (Cs), and "n" is an integer of 1 or more.

In an embodiment, the emulsion may be a styrene-butadiene rubber (SBR) emulsion.

In an embodiment, the active material may include at least one of graphite, hard carbon, soft carbon, silicon oxide (SiOx), a silicon-carbon composite (SiC), or tin.

In an embodiment, the preparation of the aqueous solution including the cellulose derivative composition including a compound represented by Formula 1, may include: adding a reactant to a precursor material of the cellulose derivative, and performing substitution reaction; preparing the cellulose derivative composition; and dissolving the cellulose derivative composition in water to prepare the aqueous solution.

In an embodiment, the precursor material of the cellulose derivative may include at least one of cellulose, methyl cellulose, ethyl cellulose, butyl cellulose, hydroxypropyl cellulose, cellulose nitrate, cellulose acetate, cellulose acetate propionate, cellulose acetate butyrate, carboxymethyl cellulose, Xanthan Gum, Pectin, Guar Gum, Dextrin, or derivatives thereof.

In an embodiment, the reactant may include at least one of a reactant including a carboxymethyl group, a reactant including a sulfur (S) element, or a reactant including a phosphorus (P) element.

In an embodiment, the reactant including a sulfur (S) element may include at least one of a sulfur trioxide pyridine complex, a sulfur trioxide triethylamine complex, a sulfur trioxide trimethylamine complex, a sulfur trioxide N,N-dimethylformamide complex, a sulfur trioxide N-ethyldiisopropylamine complex, 2-chloroethanesulfonic acid, bromoethanesulfonic acid, 4-iodobenzenesulfonic acid, 3-iodobenzenesulfonic acid, 2-iodobenzenesulfonic acid, 4-bromobenzenesulfonic acid, 3-bromobenzenesulfonic acid, 2-bromobenzenesulfonic acid, saclofen, 4-chloroaniline-3-sulfonic acid, 5-amino-2-chloro-4-methylbenzenesulfonic acid, 5-amino-2-bromo-4-methylbenzenesulfonic acid, or bromaminic acid.

In an embodiment, the reactant including a phosphorus (P) element may include at least one of phosphoric acid, triethyl phosphate, diethyl phosphate, tripropyl phosphate, phosphorus(V) oxychloride, diethyl chlorophosphite, dimethyl chlorophosphite, diisopropyl chlorophosphite, diphenyl phosphoryl chloride, ethyl dichlorophosphate, diphenylphosphinic chloride, diethyl cyanophosphonate, or diethyl methyl phosphate.

In an embodiment, a composition ratio of the active material: the cellulose derivative composition and the emulsion may be about 80:20 to about 99:1 based on a weight ratio.

In an embodiment, a composition ratio of the cellulose derivative composition: the emulsion may be about 80:20 to about 40:60 based on a weight ratio.

According to an embodiment of the inventive concept, a secondary battery includes: a positive electrode; a negative electrode; and an electrolyte layer disposed between the positive electrode and the negative electrode, wherein the negative electrode includes a negative electrode active material and a mixture binder, and the mixture binder includes a cellulose derivative composition including a compound represented by Formula 1 below and a styrene-butadiene rubber (SBR) emulsion.

[Formula 1]

In Formula 1, $R_1$, $R_2$, and $R_3$ are each independently any one among a carboxymethyl group substituted with a monovalent metal (X), a functional group substituted with a monovalent metal (X) and including a sulfur (S) element, a functional group substituted with a monovalent metal (X) and including a phosphorus (P) element, and hydrogen, the monovalent metal (X) is any one among lithium (Li), potassium (K), rubidium (Rb), and cesium (Cs), and "n" is an integer of 1 or more.

In an embodiment, the positive electrode may include a positive electrode active material, an organic binder and a conductive material, and the positive electrode active material may include at least one of sulfur, $LiCoO_2$, $LiNiO_2$, $LiNi_xCo_yMn_zO_2$ (x+y+z=1), $LiMn_2O_4$, or $LiFePO_4$.

In an embodiment, the negative electrode may further include a conductive material, the conductive material may include at least one of conductive amorphous carbon, carbon nanotube, graphene, or a conductive polymer, and an amount of the conductive material may be about 0.5 wt % to about 5 wt % based on a total weight of the negative electrode.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

The above objects, features and methods for accomplishing thereof of the inventive concept will be clarified referring to embodiments below with reference to the accompanying drawings. The inventive concept may, however, be embodied in different forms and should not be construed as limited to the embodiments set forth herein. Rather, embodiments are provided so that the contents disclosed herein become thorough and complete, and the spirit of the inventive concept is sufficiently accepted for a person skilled in the art. The inventive concept is defined by the scope of claims, and like reference numerals refer to like elements for explaining each drawing throughout.

The terminology used herein is for the purpose of describing particular embodiments only and is not intended to be limiting of the invention. As used herein, the singular forms, are intended to include the plural forms as well, unless the context clearly indicates otherwise. It will be further understood that the terms "comprises" and/or "comprising", when used in this specification, specify the presence of stated elements, steps, operations, and/or devices, but do not preclude the presence or addition of one or more other elements, steps, operations, and/or devices.

It will be understood that when a film (or layer) is referred to as being "on" another film (or layer), the film (or layer) can be directly on the other film (or layer), or intervening films (or layers) may be present.

In addition, the embodiments described in the present disclosure will be explained referring to cross-sectional views and/or plan views of ideal illustrations of the inventive concept. In the drawings, the thicknesses of layers and areas are exaggerated for effective explanation of the technical contents. Accordingly, the shape of the illustrations may be deformed by manufacturing technique and/or tolerance. Accordingly, the embodiments of the inventive concept are not limited to the illustrated specific shapes but include changed shapes produced according to a manufacturing process. Therefore, the regions shown in the drawings have schematic property, the shape of the regions illustrated are for showing the specific shape of the regions of a device, but are not intent to limit the scope of the invention.

The terms used in the embodiments of the inventive concept may be interpreted as commonly known meanings to a person skilled in the art unless otherwise defined.

Figure 1:
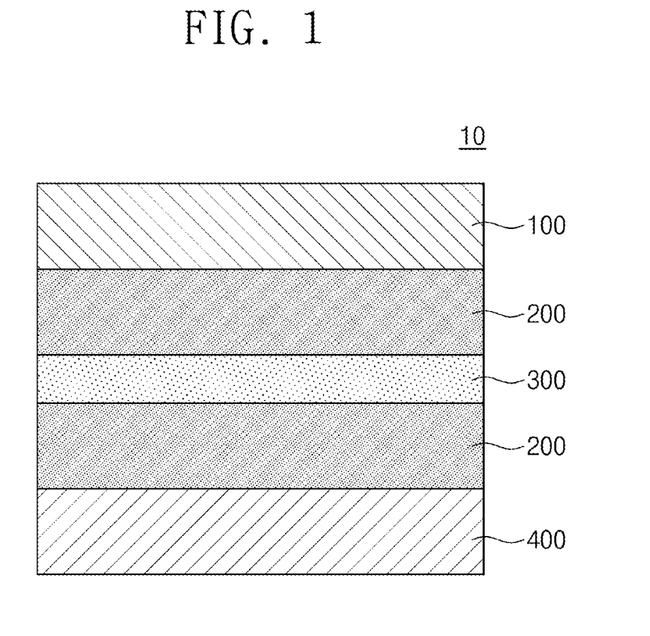
FIG. 1 is a cross-sectional view showing a secondary battery according to an embodiment of the inventive concept.

FIG. 1 is a cross-sectional view showing a secondary battery according to an embodiment of the inventive concept.

Referring to FIG. 1, a secondary battery 10 may include a positive electrode 100, an electrolyte layer 200, a separator 300, and a negative electrode 400. The positive electrode 100 and the negative electrode 400 may be separately disposed and may be opposite to each other. The electrolyte layer 200 may be disposed between the positive electrode 100 and the separator 300, and between the separator 300 and the negative electrode 400.

The secondary battery 10 may be, for example, a lithium secondary battery. The positive electrode 100 may include a positive electrode active material. The positive electrode active material may include at least one of sulfur, $LiCoO_2$, $LiNiO_2$, $LiNi_xCo_yMn_zO_2$ (x+y+z=1), $LiMn_2O_4$, or $LiFePO_4$.

The positive electrode 100 may further include an organic binder and a conductive material. The organic binder and the conductive material may improve the mechanical adhesion and electroconductivity of the positive electrode 100. For example, the organic binder may include fluorine-based polymers, for example, polyvinylidene fluoride (PVdF). For example, the conductive material may include at least one of conductive amorphous carbon, carbon nanotube, or graphene. For example, the amount ratio of active material: organic binder:conductive material in the positive electrode may be about 80:10:10 to about 96:2:2.

The negative electrode 400 may include a negative active material. The negative electrode active material may include at least one of graphite, hard carbon, soft carbon, a silicon-carbon composite (SiC), silicon oxide ($SiO_x$), or tin (Sn).

The negative electrode 400 may further include a mixture binder composition. The mixture binder composition may include a cellulose derivative composition and a styrene-butadiene rubber (SBR) emulsion. Accordingly, the mixture binder composition may be a mixture aqueous binder. The mixture aqueous binder of the inventive concept may be applied to a graphite-based negative electrode for a secondary battery. More particularly, the mixture aqueous binder of the inventive concept may be a mixture aqueous binder prepared by synthesizing cellulose derivatives which are substituted with various functional groups and mixing thereof with a styrene-butadiene rubber emulsion.

The cellulose derivative composition may include a compound represented by Formula 1 below.

[Formula 1]

In Formula 1, $R_1$, $R_2$, and $R_3$ are each independently any one among a carboxymethyl group substituted with a monovalent metal (X), a functional group substituted with a monovalent metal (X) and including a sulfur (S) element, a functional group substituted with a monovalent metal (X) and including a phosphorus (P) element, and hydrogen, the monovalent metal (X) is any one among lithium (Li), potassium (K), rubidium (Rb), and cesium (Cs), and "n" is an integer of 1 or more.

The repeating unit of the cellulose derivative may be a cellulose-based repeating unit group including a hydroxyl group (—OH), and $R_1$, $R_2$, and $R_3$ may be obtained by substituting a hydroxyl group, a carboxylic acid, a sulfonic acid, a phosphoric acid, or sodium substituents thereof, present in a cellulose polymer, with a functional group including a monovalent metal of lithium, potassium, rubidium or cesium.

The carboxymethyl group substituted with the monovalent metal (X) may be —$CH_2COOX$.

The functional group substituted with a monovalent metal (X) and including a sulfur (S) element may include a sulfonate (—$SO_3^{2-}$). For example, the functional group substituted with a monovalent metal (X) and including a sulfur (S) element may be —$SO_3X$.

The functional group substituted with a monovalent metal (X) and including a phosphorus (P) element may include phosphite ($PO_3^{3-}$) or phosphate ($PO_4^{3-}$). For example, the functional group substituted with a monovalent metal (X) and including a phosphorus (P) element may be —$PO_3RX$ or —$PO_3X_2$, and R may be a hydrocarbon group of 1 to 10 carbon atoms.

In some embodiment, the compound represented by [Formula 1] may be the Formula of Xanthan Gum below, where at least one H in —COOH functional groups is substituted with a monovalent metal among lithium (Li), potassium (K), rubidium (Rb), and cesium (Cs).

[Formula of Xanthan Gum]

In some embodiments, the compound represented by [Formula 1] may be the Formula of Pectin below, where at least one H in —COOH functional groups is substituted with a monovalent metal among lithium (Li), potassium (K), rubidium (Rb), and cesium (Cs).

[Formula of Pectin]

In some embodiments, the compound represented by [Formula 1] may be the Formula of Guar Gum below, where at least one H in —OH functional groups is substituted with a carboxymethyl group substituted with a monovalent metal (X), a functional group substituted with a monovalent metal (X) and including a sulfur (S) element, or a functional group substituted with a monovalent metal (X) and including a phosphorus (P) element. For example, the carboxymethyl group substituted with a monovalent metal (X) may be —CH$_2$COOX, the functional group substituted with a monovalent metal (X) and including a sulfur (S) element may be —SO$_3$X, and the functional group substituted with a monovalent metal (X) and including a phosphorus (P) element may be —PO$_3$RX or —PO$_3$X$_2$. In this case, R may be a hydrocarbon group of 1 to 10 carbon atoms. The monovalent metal (X) may be any one among lithium (Li), potassium (K), rubidium (Rb), and cesium (Cs).

[Formula of Guar Gum]

In some embodiments, the compound represented by [Formula 1] may be the Formula of Dextran below, where at least one H in —OH functional groups is substituted with a carboxymethyl group substituted with a monovalent metal (X), a functional group substituted with a monovalent metal (X) and including a sulfur (S) element, or a functional group substituted with a monovalent metal (X) and including a phosphorus (P) element. For example, the carboxymethyl group substituted with a monovalent metal (X) may be —CH$_2$COOX, the functional group substituted with a monovalent metal (X) and including a sulfur (S) element may be —SO$_3$X, and the functional group substituted with a monovalent metal (X) and including a phosphorus (P) element may be —PO$_3$RX or —PO$_3$X$_2$. In this case, R may be a hydrocarbon group of 1 to 10 carbon atoms. The monovalent metal (X) may be any one among lithium (Li), potassium (K), rubidium (Rb), and cesium (Cs). The monovalent metal (X) may be any one among lithium (Li), potassium (K), rubidium (Rb), and cesium (Cs).

[Formula of Dextran]

For example, the composition ratio of the negative electrode active material and the mixture aqueous binder may be about 60:40 to about 99.5:0.5, or about 80:20 to about 99:1 by the weight ratio. For example, the composition ratio of the cellulose derivative composition and the SBR emulsion may be about 99:1 to about 1:99, or about 80:20 to about 40:60 based on the weight ratio.

The cellulose derivative is a material not dissolving in water by nature, but through the alkalization and substitution with a functional group, its properties are changed into those of a material which is easily dissolved in water. In this case, by common alkalization, the cellulose is substituted with sodium and shows wetting and dissolving properties in water. Generally, the conventional sodium-substituted Na-CMC has defects of taking long time for dissolving by 100% in water. Accordingly, when dissolving in limited conditions of a process time, the Na-CMC may be incompletely dissolved in an aqueous solution and remain as semitransparent aggregation, or microgels as a filiform floating material may be easily formed. In order to solve such defects, an inconvenient process of removing microgels by filtering a binder aqueous solution is additionally required. In addition, there are limitations for the conventional Na-CMC in improving the properties of immersing in an electrolyte and the maintaining the immersed electrolyte within a negative electrode which is thickened.

However, according to the inventive concept, by introducing lithium, potassium, rubidium, or cesium ions into the structure of a cellulose derivative, affinity with an aqueous solution may be improved, and wetting properties of water and a dissolution rate in an aqueous solution may be improved. In addition, microgels may not be formed even in a short preparation time, and the manufacturing speed of an electrode may be increased, and a manufacturing process may be simplified. In addition, the immersion properties in an electrolyte in a negative electrode, the maintaining properties of the immersed electrolyte, and the moving properties of lithium ions in an electrode may be improved.

The negative electrode 400 may further include a conductive material. The content of the conductive material may be about 0.5 wt % to about 5 wt % based on the total weight of the negative electrode 400. The conductive material may include at least one of conductive amorphous carbon, carbon nanotube, graphene, or a conductive polymer.

The electrolyte layer 200 may play the function of transferring ions to the positive electrode 100 and the negative electrode 400. The electrolyte layer 200 may include, for example, a liquid electrolyte. The electrolyte layer 200 may include a lithium salt and an organic solvent. The lithium salt may include at least one of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$. The organic solvent may include a cyclic carbonate or a linear carbonate. For example, the cyclic carbonate may include at least one of γ-butyrolactone, ethylene carbonate, propylene carbonate, glycerin carbonate, vinylene carbonate, or fluoroethylene carbonate. For example, the linear carbonate may include at least one of dimethyl carbonate, diethyl carbonate, ethyl methyl carbonate, dimethoxyethane, or dimethyl ethylene carbonate. The concentration of a lithium salt in the electrolyte layer 200 may be from about 1 M to about 3 M. In some embodiments of the inventive concept, the electrolyte layer 200 may further include an additive to improve the performance of a secondary battery. The additive may include fluoroethylene carbonate or vinylene carbonate.

The separator 300 may be disposed in the electrolyte layer 200. The separator 300 may prevent electric short between the positive electrode 100 and the negative electrode 400. For example, the separator 300 may include a separator base material. On the separator base material, a composition for coating a secondary battery separator may be applied. The separator base material may include, for example, at least one of polyolefin such as polyethylene and polypropylene, or cellulose. In some embodiments, the separator base material may include a porous polymer layer or a nonwoven fabric.

Figure 2:
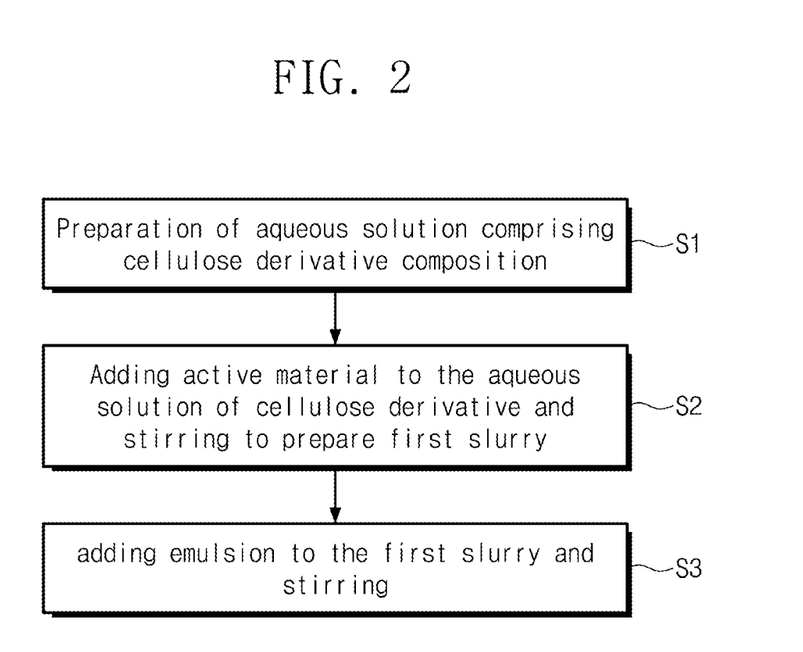
FIG. 2 is a flowchart for explaining a method of preparing a composition for a secondary battery electrode according to an embodiment of the inventive concept.

FIG. 2 is a flowchart for explaining a method of preparing a composition for a secondary battery electrode according to an embodiment of the inventive concept. Hereinafter, overlapping parts as the above-described contents may be omitted.

Referring to FIG. 2, a method of preparing a composition for a secondary battery electrode according to an embodiment of the inventive concept may include: preparing an aqueous solution comprising a cellulose derivative composition comprising a compound represented by Formula 1 below (S1); adding an active material to the aqueous solution and stirring to prepare a first slurry (S2); and adding an emulsion to the first slurry and stirring (S3).

[Formula 1]

In Formula 1, $R_1$, $R_2$, and $R_3$ are each independently any one among a carboxymethyl group substituted with a monovalent metal (X), a functional group substituted with a monovalent metal (X) and including a sulfur (S) element, a functional group substituted with a monovalent metal (X) and including a phosphorus (P) element, and hydrogen, the monovalent metal (X) is any one among lithium (Li), potassium (K), rubidium (Rb), and cesium (Cs), and "n" is an integer of 1 or more.

The repeating unit of the cellulose derivative may be a cellulose-based repeating unit group including a hydroxyl group (—OH), and $R_1$, $R_2$, and $R_3$ may be obtained by substituting a hydroxyl group, a carboxylic acid, a sulfonic acid, a phosphoric acid, or sodium substituents thereof, present in a cellulose polymer, with a functional group including a monovalent metal of lithium, potassium, rubidium or cesium.

The carboxymethyl group substituted with the monovalent metal (X) may be —$CH_2COOX$.

The functional group substituted with a monovalent metal (X) and including a sulfur (S) element may include a sulfonate (—$SO_3^2$). For example, the functional group substituted with a monovalent metal (X) and including a sulfur (S) element may be —$SO_3X$.

The functional group substituted with a monovalent metal (X) and including a phosphorus (P) element may include phosphite ($PO_3^{3-}$) or phosphate ($PO_4^{3-}$). For example, the functional group substituted with a monovalent metal (X) and including a phosphorus (P) element may be —$PO_3RX$ or —$PO_3X_2$, and R may be a hydrocarbon group of 1 to 10 carbon atoms.

The preparation of the aqueous solution of the cellulose derivative (S1) may include: adding a reactant to a precursor material of the cellulose derivative and performing substitution reaction; preparing a cellulose derivative composition; and dissolving the cellulose derivative composition in water to prepare an aqueous solution.

The precursor material of the cellulose derivative may include at least one of cellulose, methyl cellulose, ethyl cellulose, butyl cellulose, hydroxypropyl cellulose, cellulose nitrate, cellulose acetate, cellulose acetate propionate, cellulose acetate butyrate, carboxymethyl cellulose, Xanthan Gum, Pectin, Guar Gum, Dextran, or derivatives thereof.

In some embodiment, in the case where the precursor material of the cellulose derivative is Xanthan Gum, the cellulose derivative according to the inventive concept may have a structure where at least one H in —COOH functional groups is substituted with a monovalent metal among lithium (Li), potassium (K), rubidium (Rb), and cesium (Cs).

[Formula of Xanthan Gum]

In some embodiments, in the case where the precursor material of the cellulose derivative is Pectin, the cellulose derivative according to the inventive concept may have a structure where at least one H in —COOH functional groups is substituted with a monovalent metal among lithium (Li), potassium (K), rubidium (Rb), and cesium (Cs).

[Formula of Pectin]

In some embodiments, in the case where the precursor material of the cellulose derivative is Guar Gum, the cellulose derivative according to the inventive concept may have a structure where at least one H in —OH functional groups is substituted with a carboxymethyl group substituted with a monovalent metal (X), a functional group substituted with a monovalent metal (X) and including a sulfur (S) element, or a functional group substituted with a monovalent metal (X) and including a phosphorus (P) element. For example, the carboxymethyl group substituted with a monovalent metal (X) may be —CH$_2$COOX, the functional group substituted with a monovalent metal (X) and including a sulfur (S) element may be —SO$_3$X, and the functional group substituted with a monovalent metal (X) and including a phosphorus (P) element may be —PO$_3$RX or —PO$_3$X$_2$. In this case, R may be a hydrocarbon group of 1 to 10 carbon atoms. The monovalent metal (X) may be any one among lithium (Li), potassium (K), rubidium (Rb), and cesium (Cs).

[Formula of Guar Gum]

In some embodiments, in the case where the precursor material of the cellulose derivative is Dextran, the cellulose derivative according to the inventive concept may have a structure where at least one H in —OH functional groups is substituted with a carboxymethyl group substituted with a monovalent metal (X), a functional group substituted with a monovalent metal (X) and including a sulfur (S) element, or a functional group substituted with a monovalent metal (X) and including a phosphorus (P) element. For example, the carboxymethyl group substituted with a monovalent metal (X) may be —CH$_2$COOX, the functional group substituted with a monovalent metal (X) and including a sulfur (S) element may be —SO$_3$X, and the functional group substituted with a monovalent metal (X) and including a phosphorus (P) element may be —PO$_3$RX or —PO$_3$X$_2$. In this case, R may be a hydrocarbon group of 1 to 10 carbon atoms. The monovalent metal (X) may be any one among lithium (Li), potassium (K), rubidium (Rb), and cesium (Cs).

[Formula of Dextran]

The reactant may include at least one of a reactant including a carboxymethyl group, a reactant including a sulfur (S) element, or a reactant including a phosphorus (P) element.

For example, the reactant including a sulfur (S) element may include at least one of a sulfur trioxide pyridine complex, a sulfur trioxide triethylamine complex, a sulfur trioxide trimethylamine complex, a sulfur trioxide N,N-dimethylformamide complex, a sulfur trioxide N-ethyldiisopropylamine complex, 2-chloroethanesulfonic acid, bromoethanesulfonic acid, 4-iodobenzenesulfonic acid, 3-iodobenzenesulfonic acid, 2-iodobenzenesulfonic acid, 4-bromobenzenesulfonic acid, 3-bromobenzenesulfonic acid, 2-bromobenzenesulfonic acid, saclofen, 4-chloroaniline-3-sulfonic acid, 5-amino-2-chloro-4-methylbenzenesulfonic acid, 5-amino-2-bromo-4-methylbenzenesulfonic acid, or bromaminic acid.

For example, the reactant including a phosphorus (P) element may include at least one of phosphoric acid, triethyl phosphate, diethyl phosphate, tripropyl phosphate, phosphorus(V) oxychloride, diethyl chlorophosphite, dimethyl chlorophosphite, diisopropyl chlorophosphite, diphenyl phosphoryl chloride, ethyl dichlorophosphate, diphenylphosphinic chloride, diethyl cyanophosphonate, or diethyl methyl phosphate.

The first slurry may be prepared by adding an active material to the aqueous solution of the cellulose derivative, and then, stirring and mixing (S2). For example, the active material may be a negative electrode active material and may have an active material particle shape.

By adding an emulsion to the first slurry and then, stirring and mixing a composition for a secondary battery electrode may be prepared (S3). For example, the emulsion may include a styrene-butadiene rubber (SBR) emulsion. The composition for a secondary battery electrode may have a slurry type.

According to the preparation method of the conventional composition for a secondary battery electrode, in case of mixing two binders at the same time, the dispersion of an SBR emulsion in an aqueous solution may become in disorder by the conventional CMC substituted with sodium ions, and the aggregation phenomenon of the emulsion may arise. Due to such aggregation phenomenon, SBR particles may be non-uniformly distributed among active materials, the toughness of an electrode may be degraded, and an electrode in a brittle state may be formed.

On the contrary, according to the inventive concept, in order to prepare a composition for a secondary battery electrode, an active material and an emulsion are mixed in order, and the agglomeration and aggregation of an SBR emulsion may be suppressed, while maintaining the dispersion of an SBR emulsion in a slurry at most. In addition, the cellulose derivative binder aqueous solution according to the inventive concept may not form microgels. Accordingly, the preparation rate in a large amount of a cellulose derivative binder aqueous solution may be effectively increased within a limited process time, and preparation stability and reliability may be improved.

The viscosity of the composition for a secondary battery electrode may be from about 1000 cP to about 9000 cP. If the viscosity of the composition for a secondary battery electrode is less than about 1000 cP, the mobility of the slurry of the composition for a secondary battery electrode may be maximized due to low viscosity, and though wetting properties with a current collector may increase, there are problems of forming an electrode thin. If the viscosity of the composition for a secondary battery electrode is greater than about 9000 cP, water in the slurry of the composition for a secondary battery electrode may be insufficient and volatilized during a coating process, the mobility of the slurry may be excessively reduced, and uniform coating on an electrode may not be performed continuously.

The method of manufacturing an electrode for a secondary battery according to an embodiment of the inventive concept may include: preparing an aqueous solution of a cellulose derivative represented by Formula 1; adding an active material to the aqueous solution and stirring to prepare a first slurry; adding an emulsion to the first slurry and stirring; and applying the composition for a secondary battery electrode on a current collector and drying. For example, the electrode for a secondary battery may be a negative electrode.

The explanation on the method of preparing the composition for a secondary battery electrode by adding the emulsion to the first slurry and stirring, is substantially the same as described above. A process of applying the composition for a secondary battery electrode prepared by the above-described preparation method onto current collector may be performed. For example, a process of applying the composition for a secondary battery electrode may include coating slurry onto current collector followed by roll pressing. For example, the application of the composition for a secondary battery electrode on the current collector may be performed by any one layer-thickening process among a gravure coating method, a small-diameter gravure coating method, a reverse roll coating method, a transfer roll coating method, a kiss coating method, a dip coating method, a knife coating method, an air doctor blade coating method, a blade coating method, a bar coating method, a die coating method, a screen printing method, and a spray coating method.

For example, the drying method of the composition for a secondary battery electrode applied may include hot air drying and then, drying under a reduced pressure. However, an embodiment of the inventive concept is not limited thereto, and any methods for completely removing water in a coated body may be used, without limitation. In order to satisfy the moisture content of several ppm or less in a liquid electrolyte after assembling a secondary battery cell and injecting the liquid electrolyte, sufficient drying is required. Accordingly, the process time of the drying under a reduced pressure may be about 12 hours or more. The temperature of the drying process may be about 80° C. to about 120° C. For example, in order to completely dry a water solvent, the drying may be performed at about 100° C. which is the boiling point of water.

For example, the thickness of the electrode on which the composition for a secondary battery electrode is coated may be from about 50 μm to about 300 μm. For example, the porosity of a negative electrode layer through roll pressing of the electrode at room temperature may be from about 25% to about 40%.

Example 1

To a dispersion solution of 0.85 mmol of carboxymethyl cellulose (Na-CMC), 0.64 mmol of p-toluenesulfonic acid was added and mixed, followed by stirring at room temperature for about 8 hours. 6.35 mmol of a sulfur trioxide pyridine complex was suitably added and reacted at room temperature for about 1 hour. After precipitating, the reaction mixture was dissolved in an aqueous solution of lithium hydroxide monohydrate (LiOH·H$_2$O), and substitution with a Li$^+$ monovalent metal ion was performed. After removing water under a reduced pressure, drying in vacuum was performed for about 24 hours at about 80° C. to about 120° C. to obtain a lithium-substituted cellulose derivative.

Example 2

The same process as in Example 1 was performed except for using an aqueous solution of potassium hydroxide (KOH) as a solution for substitution instead of the aqueous solution of lithium hydroxide monohydrate (LiOH·H$_2$O) after precipitating the reaction mixture, in Example 1.

Example 3

The same process as in Example 1 was performed except for using an aqueous solution of rubidium hydroxide monohydrate (RbOH·H$_2$O) as a solution for substitution instead of the aqueous solution of lithium hydroxide monohydrate (LiOH·H$_2$O) after precipitating the reaction mixture, in Example 1.

Example 4

The same process as in Example 1 was performed except for using an aqueous solution of cesium hydroxide monohydrate (CsOH·H$_2$O) as a solution for substitution instead of the aqueous solution of lithium hydroxide monohydrate (LiOH·H$_2$O) after precipitating the reaction mixture, in Example 1.

Example 5

To an aqueous solution in which lithium hydroxide monohydrate (LiOH·H$_2$O) was dissolved, Xanthan gum was added, and substitution reaction was performed at conditions of about 50° C. and about 1000 rpm. A mixture solution including lithium-substituted Xanthan gum was filtered using a vacuum filtration apparatus under reduced pressure conditions, and in this case, impurities were removed using a mixture solution of ethanol/$H_2O$ (90/10, v/v). Then, drying in a vacuum oven of about 80° C. was performed for about 12 hours for removing solvents.

Example 6

The same process as in Example 5 was performed except for using an aqueous solution of potassium hydroxide (KOH) as a solution for substitution instead of the aqueous solution of lithium hydroxide monohydrate (LiOH·$H_2O$), in Example 5.

Example 7

The same process as in Example 5 was performed except for using an aqueous solution of rubidium hydroxide monohydrate (RbOH·$H_2O$) as a solution for substitution instead of the aqueous solution of lithium hydroxide monohydrate (LiOH·$H_2O$), in Example 5.

Example 8

The same process as in Example 5 was performed except for using an aqueous solution of cesium hydroxide monohydrate (CsOH·$H_2O$) as a solution for substitution instead of the aqueous solution of lithium hydroxide monohydrate (LiOH·$H_2O$), in Example 5.

Comparative Example 1

In order to compare substitution effects of a cellulose derivative composition of the inventive concept with a functional group, a commercial product, CMC was applied as a comparative example.

Example 9

After preparing a mixture binder with an SBR emulsion based on the lithium sulfate-substituted cellulose derivative binder, synthesized in Example 1, a negative electrode slurry was prepared, and the electrode slurry was coated on a current collector. As a negative electrode active material, natural graphite particles having an average particle size of about 10 μm was used. The polymer solid content in the cellulose derivative binder aqueous solution of Example 1 was about 1 wt %, and a water solvent was added thereto to dilute to a 0.5 wt % solution and used. A slurry based on 10 g of a solute was prepared, and the weight ratio of the natural graphite and the cellulose derivative aqueous binder synthesized was set to about 98:1. After mixing a first slurry, an SBR emulsion was added, and the weight ratio of natural graphite:cellulose derivative aqueous binder synthesized: the solute of SBR emulsion was set to about 98:1:1. Accordingly, the weight ratio of the cellulose derivative and the SBR emulsion of about 50:50 was applied. That is, 9.8 g of the natural graphite and 10 g (1 wt % solution) of the aqueous binder solution of Example 1 were mixed, and then, 0.22 g of the SBR emulsion (solid content of 46%) was mixed. For uniform mixing, a stirring process was performed using a planetary mixer at about 2000 rpm for about 20 minutes. Zirconia balls of about 5 mm were added and stirred together for maximizing the dispersion of the natural graphite and for solving the aggregation phenomenon of SBR, and the viscosity of the slurry was controlled to about 1500 cP to about 3000 cP. Through a doctor blade method, a slurry coating process on a current collector was performed. By controlling the gap of a doctor blade to about 250 μm, a negative electrode with a thickness after drying of about 180 μm and with a final thickness of about 120 μm after roll pressing at room temperature was manufactured. The composition of the positive electrode was set to the ratio of NCM622 positive electrode active material:PVdF binder: conductive material to about 96:2:2 by a weight ratio, and the positive electrode was manufactured. In this case, the thickness of the electrode was designed to control to about 200 μm after roll pressing so that the ratio of negative electrode capacity/positive electrode capacity of about 1.02. In addition, a liquid electrolyte prepared by mixing ethylene carbonate and ethyl methyl carbonate, which were organic solvents, so that the weight ratio thereof was about 3:7, and dissolving a lithium salt of lithium hexafluorophosphate in about 1.3 mol, was injected into a single cell to manufacture a cell.

Example 10

The same process as in Example 9 was performed except for using the potassium sulfate-substituted cellulose derivative binder synthesized in Example 2 instead of Example 1.

Example 11

The same process as in Example 9 was performed except for using the rubidium sulfate-substituted cellulose derivative binder, synthesized in Example 3 instead of Example 1.

Example 12

The same process as in Example 9 was performed except for using the cesium sulfate-substituted cellulose derivative binder, synthesized in Example 4 instead of Example 1.

Example 13

The same process as in Example 9 was performed except for using the lithium-substituted Xanthan gum, synthesized in Example 5 instead of Example 1, as the cellulose derivative binder.

Example 14

The same process as in Example 9 was performed except for using the potassium-substituted Xanthan gum, synthesized in Example 6 instead of Example 1, as the cellulose derivative binder.

Example 15

The same process as in Example 9 was performed except for using the rubidium-substituted Xanthan gum, synthesized in Example 7 instead of Example 1, as the cellulose derivative binder.

Example 16

The same process as in Example 9 was performed except for using the cesium-substituted Xanthan gum, synthesized in Example 8 instead of Example 1, as the cellulose derivative binder.

Comparative Example 2

In order to compare the substitution effects of the cellulose derivative composition of the inventive concept with a functional group, an SBR/Na-CMC mixture binder was prepared by the same process as Example 9 and applied as Comparative Example 2.

Experimental Example 1

Figure 3:
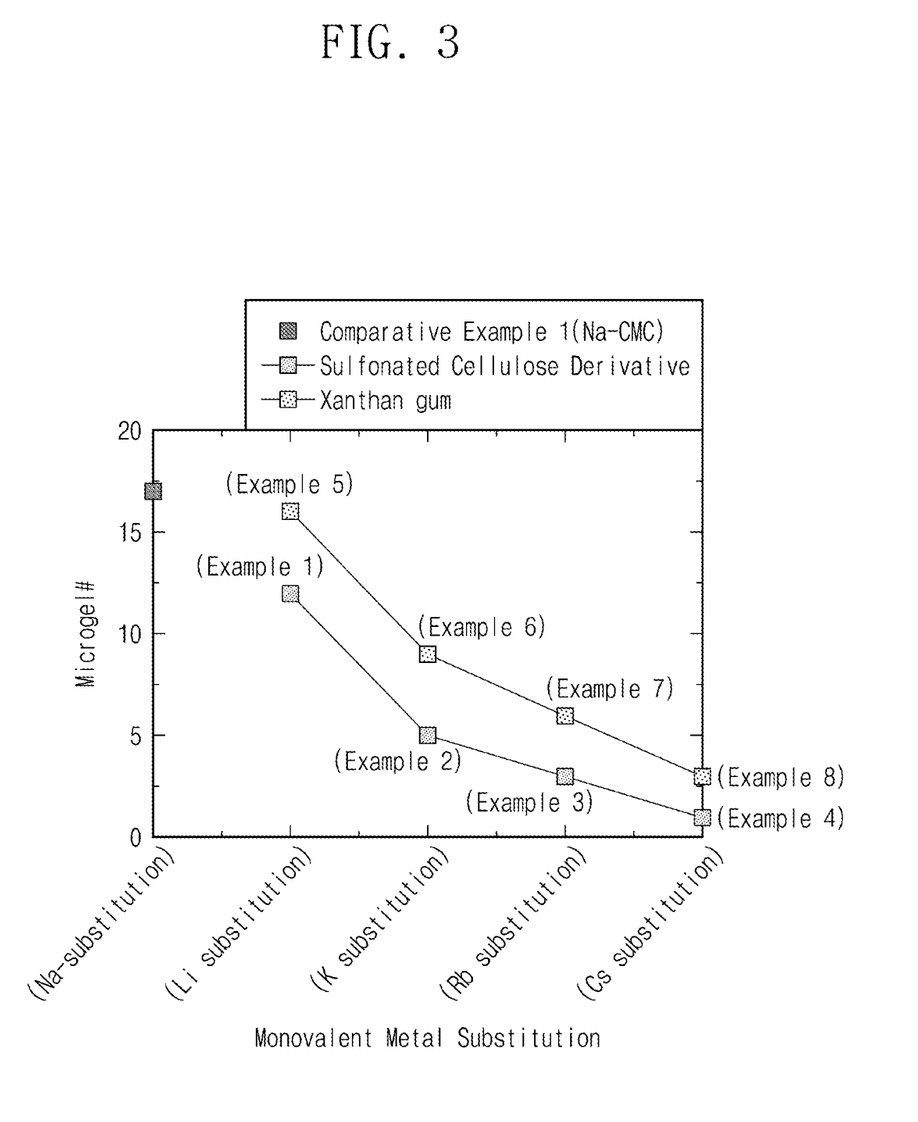
FIG. 3 shows measured results on the number of microgels with the naked eye after applying solutions immediately after stirring and dissolving the same amounts of Example 1 to Example 8, and Comparative Example 1 for about 20 minutes, on transparent films.

FIG. 3 shows measured results on the number of microgels with the naked eye after applying solutions immediately after stirring and dissolving the same amounts of the cellulose derivatives of Example 1 to Example 8 prepared according to the substitution type of a monovalent metal, and the Na-CMC of Comparative Example 1 for about 20 minutes, on transparent films. Referring to FIG. 3, it could be confirmed that cases of substituting with monovalent metals having greater ionic radii than sodium (potassium, rubidium, cesium) showed markedly reduced number of microgels.

Figure 4:
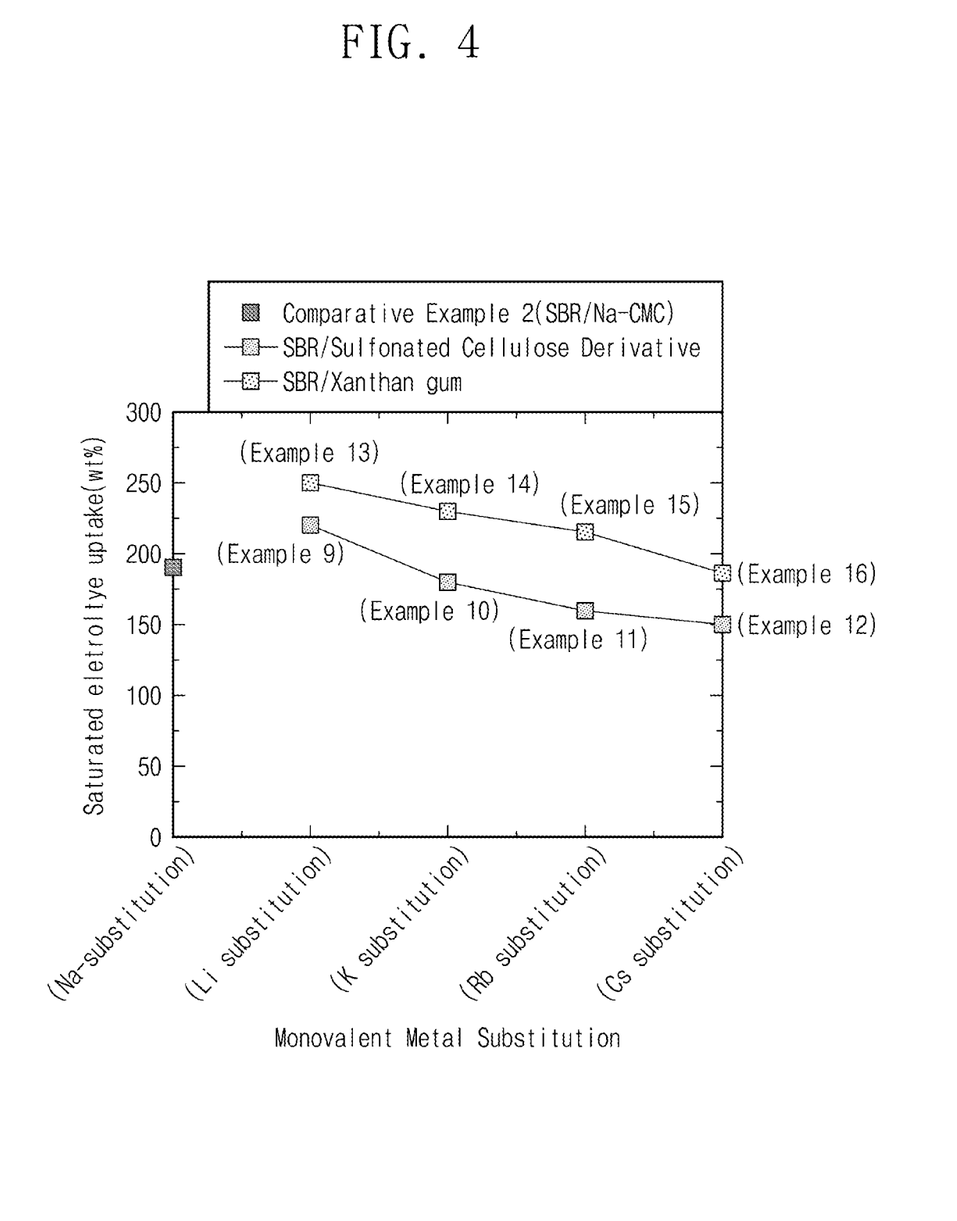
FIG. 4 shows measured results on amounts of electrolytes immersed within negative electrodes after saturation immersing each of negative electrode to which each of the mixture binders of Example 9 to Example 16, and Comparative Example 2 is applied, in a liquid electrolyte.

FIG. 4 shows measured results on amounts of electrolytes immersed within negative electrodes after saturation immersing each negative electrode to which each of the mixture binders of Example 9 to Example 16 (SBR/monovalent metal-substituted cellulose derivatives) and the mixture binder of Comparative Example 2 (SBR/CMC mixture binder) is applied, in a liquid electrolyte. Referring to FIG. 4, it could be confirmed that in case of substituting with a monovalent metal having a smaller ionic radius (lithium) than sodium, immersion capacity was excellent.

Figure 5:
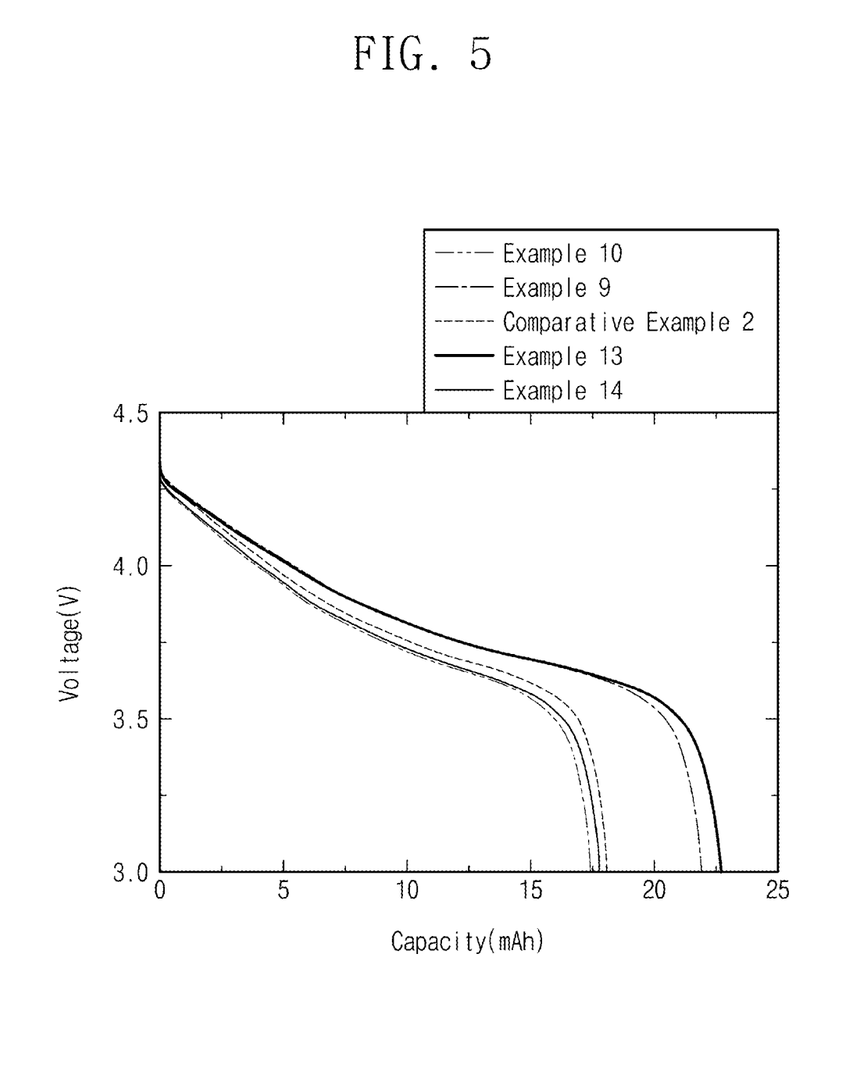
FIG. 5 is a graph on initial discharge capacity after constituting a single cell using each negative electrode to which each of the mixture binders of Example 9, Example 10, Example 13, Example 14, and Comparative Example 2 is applied.

FIG. 5 is a graph on initial discharge capacity after constituting a single cell using each negative electrode to which each of the mixture binders of Example 9, Example 10, Example 13, Example 14, and Comparative Example 2 is applied. Referring to FIG. 5, it could be observed that Example 9 and Example 13, in which lithium was substituted, showed somewhat larger initial discharge capacity when compared to Comparative Example 2, and it is considered that the difference of an initial immersed electrolyte amount results a difference in distribution in an electrolyte in a thickened electrode.

Figure 6:
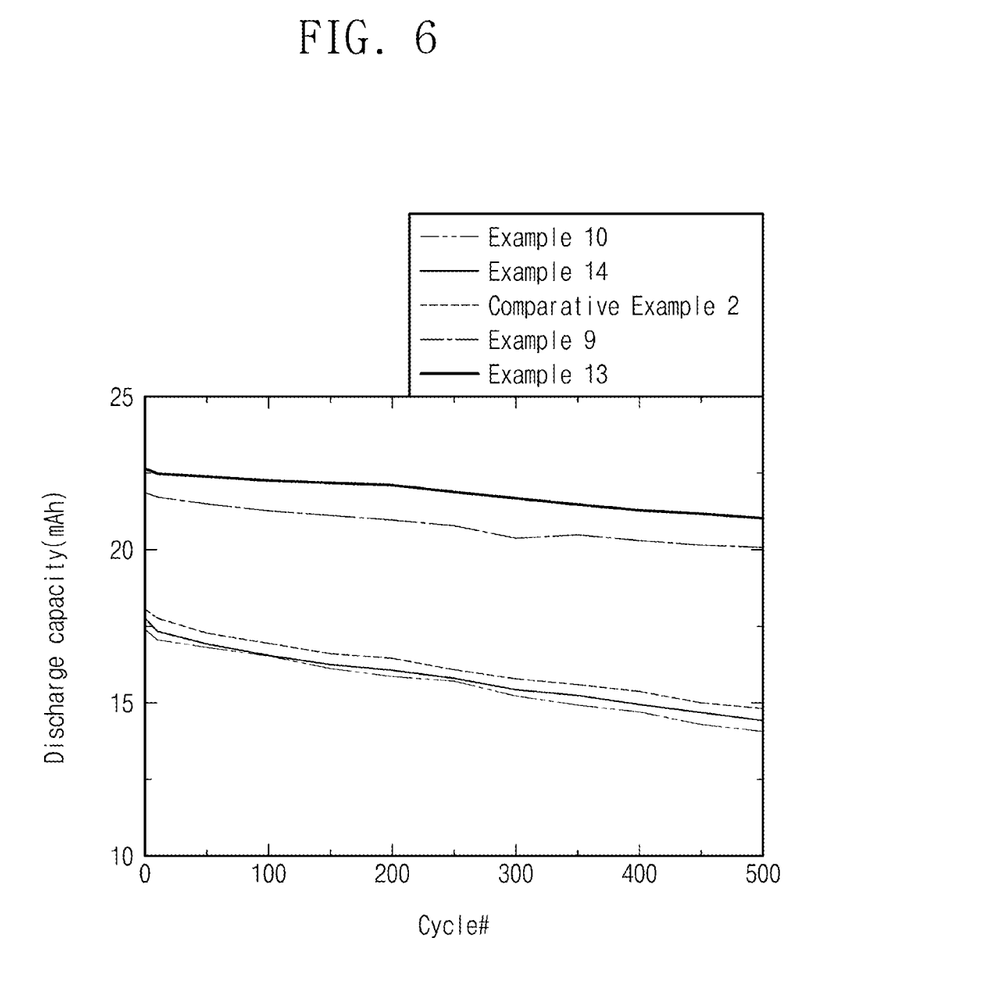
FIG. 6 is a graph on life characteristics after constituting a single cell using each negative electrode to which each of the mixture binders of Example 9, Example 10, Example 13, Example 14, and Comparative Example 2 is applied.

FIG. 6 is a graph on life characteristics after constituting a single cell using each thickened negative electrode to which each of the mixture binders of Example 9, Example 10, Example 13, Example 14, and Comparative Example 2 is applied. It could be confirmed that during repeating charging and discharging 500 times, Example 9 and Example 13 substituted with lithium, showed better capacity retention characteristic when compared to Comparative Example 2.

According to the inventive concept, by introducing lithium ions which are the same as charge carriers in a liquid electrolyte in the structure of a cellulose derivative, a lithium single ion pathway may be effectively formed in an electrode without competition between mixed hetero cations, the dissociation of lithium ions in a liquid electrolyte may be promoted to increase the concentration of lithium ions in an electrode, and instant lithium ion depletion phenomenon in an electrode due to the increase of the rate of a battery may be suppressed. Accordingly, ion mobility in an electrode may be improved, affinity and compatibility with a liquid electrolyte impregnated in an electrode may be improved, the energy density of a secondary battery may be improved, and rate capability may be reinforced according to the improvement of lithium mobility in the electrode, and output characteristics may be improved.

According to the inventive concept, by introducing potassium, rubidium, or cesium ions in the structure of a cellulose derivative, affinity with an aqueous solution may be improved, and wettability of water and a dissolution rate in the aqueous solution may be improved. Further, microgels may not be formed even in a short preparation time, and electrode manufacturing speed may be improved, and a manufacturing process may be simplified.

The composition for a secondary battery electrode according to the inventive concept may improve the adhesion strength between active material particles during manufacturing a negative electrode and reinforce the adhesion between the negative electrode and a current collector, thereby increasing the loading amount of an active material in the negative electrode and the thickness of an electrode. Ultimately, according to the inventive concept, the expanded design of cell capacity may be possible, and the manufacture of a lithium secondary battery based on a liquid electrolyte which has improved energy density may be possible. Particularly, the reinforcement of the adhesion between active material particles and the adhesion between the composition for an electrode and the current collector according to the sodium acid functional group, may contribute to the improvement of the long-life characteristics and rate capacity of a secondary battery cell.

Although the embodiments of the present invention have been described, it is understood that the present invention should not be limited to these embodiments, but various changes and modifications can be made by one ordinary skilled in the art within the spirit and scope of the present invention as hereinafter claimed.

What is claimed is:

1. A cellulose derivative composition for a secondary battery binder, comprising a compound represented by the following Formula 1:

[Formula 1]

wherein, in Formula 1, at least one of $R_1$, $R_2$, and $R_3$ is a functional group substituted with a monovalent metal (X) and comprising a phosphorus (P) element, and any remaining radicals of $R_1$, $R_2$, and $R_3$ are each independently any one among a carboxymethyl group substituted with a monovalent metal (X), a functional group substituted with a monovalent metal (X) and comprising a sulfur (S) element, and hydrogen, the monovalent metal (X) is any one among lithium (Li), potassium (K), rubidium (Rb), and cesium (Cs), and "n" is an integer of 1 or more, and wherein the functional group substituted with a monovalent metal (X) and comprising a phosphorus (P) element is —$PO_3RX$ or —$PO_3X_2$, and

R is a hydrocarbon group of 1 to 10 carbon atoms.

2. The cellulose derivative composition for a secondary battery binder of claim 1, wherein the functional group substituted with a monovalent metal (X) and comprising a sulfur (S) element is —$SO_3X$.

3. The cellulose derivative composition for a secondary battery binder of claim 1, wherein the compound represented by [Formula 1] is the following Formula of Guar Gum, where at least one H in —OH functional groups is substituted with the functional group substituted with a monovalent metal (X) and comprising a phosphorus (P) element:

[Formula of Guar Gum]

4. The cellulose derivative composition for a secondary battery binder of claim 1, wherein the compound represented by [Formula 1] is the following Formula of Dextran, where at least one H in —OH functional groups is substituted with the functional group substituted with a monovalent metal (X) and comprising a phosphorus (P) element:

[Formula of Dextran]

5. A method of preparing a composition for a secondary battery electrode, the method comprising:
preparing an aqueous solution comprising a cellulose derivative composition comprising a compound represented by the following Formula 1;
adding an active material to the aqueous solution of the cellulose derivative and stirring to prepare a first slurry; and
adding an emulsion to the first slurry and stirring:

[Formula 1]

wherein, in Formula 1, at least one of $R_1$, $R_2$, and $R_3$ is a functional group substituted with a monovalent metal (X) and comprising a phosphorus (P) element, and any remaining radicals of $R_1$, $R_2$, and $R_3$ are each independently any one among a carboxymethyl group substituted with a monovalent metal (X), a functional group substituted with a monovalent metal (X) and comprising a sulfur (S) element, and hydrogen, the monovalent metal (X) is any one among lithium (Li), potassium (K), rubidium (Rb), and cesium (Cs), and
"n" is an integer of 1 or more, and
wherein the functional group substituted with a monovalent metal (X) and comprising a phosphorus (P) element is —$PO_3RX$ or —$PO_3X$, and
R is a hydrocarbon group of 1 to 10 carbon atoms.

6. The method of preparing a composition for a secondary battery electrode of claim 5, wherein the emulsion is a styrene-butadiene rubber (SBR) emulsion.

7. The method of preparing a composition for a secondary battery electrode of claim 5, wherein the active material comprises at least one of graphite, hard carbon, soft carbon, silicon oxide (SiOx), a silicon-carbon composite (SiC), or tin.

8. The method of preparing a composition for a secondary battery electrode of claim 5, wherein the preparation of the aqueous solution comprising the cellulose derivative composition comprising a compound represented by Formula 1, comprises:
adding at least one reactant to a precursor material of the cellulose derivative, and performing substitution reaction;
preparing the cellulose derivative composition; and
dissolving the cellulose derivative composition in water to prepare the aqueous solution.

9. The method of preparing a composition for a secondary battery electrode of claim 8, wherein the precursor material of the cellulose derivative comprises at least one of cellulose, methyl cellulose, ethyl cellulose, butyl cellulose, hydroxypropyl cellulose, cellulose nitrate, cellulose acetate, cellulose acetate propionate, cellulose acetate butyrate, carboxymethyl cellulose, or derivatives thereof.

10. The method of preparing a composition for a secondary battery electrode of claim 8, wherein the at least one reactant comprises a reactant comprising a phosphorus (P) element and at least one of a reactant comprising a carboxymethyl group and a reactant comprising a sulfur (S) element.

11. The method of preparing a composition for a secondary battery electrode of claim 10, wherein the reactant comprising a sulfur (S) element comprises at least one of a sulfur trioxide pyridine complex, a sulfur trioxide triethylamine complex, a sulfur trioxide trimethylamine complex, a sulfur trioxide N,N-dimethylformamide complex, a sulfur trioxide N-ethyldiisopropylamine complex, 2-chloroethanesulfonic acid, bromoethanesulfonic acid, 4-iodobenzenesulfonic acid, 3-iodobenzenesulfonic acid, 2-iodobenzenesulfonic acid, 4-bromobenzenesulfonic acid, 3-bromobenzenesulfonic acid, 2-bromobenzenesulfonic acid, saclofen, 4-chloroaniline-3-sulfonic acid, 5-amino-2-chloro-4-methylbenzenesulfonic acid, 5-amino-2-bromo-4-methylbenzenesulfonic acid, or bromaminic acid.

12. The method of preparing a composition for a secondary battery electrode of claim 10, wherein the reactant comprising a phosphorus (P) element comprises at least one of phosphoric acid, triethyl phosphate, diethyl phosphate, tripropyl phosphate, phosphorus(V) oxychloride, diethyl chlorophosphite, dimethyl chlorophosphite, diisopropyl chlorophosphite, diphenyl phosphoryl chloride, ethyl dichlorophosphite, diphenylphosphinic chloride, diethyl cyanophosphonate, or diethyl methyl phosphate.

13. The method of preparing a composition for a secondary battery electrode of claim 5, wherein a composition ratio of the active material:the cellulose derivative composition and the emulsion is about 80:20 to about 99:1 based on a weight ratio.

14. The method of preparing a composition for a secondary battery electrode of claim 5, wherein a composition ratio of the cellulose derivative composition:the emulsion is about 80:20 to about 40:60 based on a weight ratio.

15. A secondary battery comprising:
a positive electrode;
a negative electrode; and
an electrolyte layer disposed between the positive electrode and the negative electrode,
wherein the negative electrode comprises a negative electrode active material and a mixture binder, and
the mixture binder comprises a cellulose derivative composition comprising a compound represented by the following Formula 1 and a styrene-butadiene rubber (SBR) emulsion:

[Formula 1]

wherein, in Formula 1, at least one of $R_1$, $R_2$, and $R_3$ is a functional group substituted with a monovalent metal (X) and comprising a phosphorus (P) element, and any remaining radicals of $R_1$, $R_2$, and $R_3$ are each independently any one among a carboxymethyl group substituted with a monovalent metal (X), a functional group substituted with a monovalent metal (X) and comprising a sulfur (S) element, and hydrogen,
the monovalent metal (X) is any one among lithium (Li), potassium (K), rubidium (Rb), and cesium (Cs), and
"n" is an integer of 1 or more, and
wherein the functional group substituted with a monovalent metal (X) and comprising a phosphorus (P) element is —$PO_3RX$ or —$PO_3X_2$, and
R is a hydrocarbon group of 1 to 10 carbon atoms.

16. The secondary battery of claim 15, wherein
the positive electrode comprises a positive electrode active material, an organic binder and a conductive material, and
the positive electrode active material comprises at least one of sulfur, $LiCoO_2$, $LiNiO_2$, $LiNi_xCo_yMn_zO_2$ (x+y+z=1), $LiMn_2O_4$, or $LiFePO_4$.

17. The secondary battery of claim 15, wherein
the negative electrode further comprises a conductive material,
the conductive material comprises at least one of conductive amorphous carbon, carbon nanotube, graphene, or a conductive polymer, and
an amount of the conductive material is about 0.5 wt % to about 5 wt % based on a total weight of the negative electrode.

* * * * *